United States Patent
Takeda

(10) Patent No.: US 6,678,099 B2
(45) Date of Patent: Jan. 13, 2004

(54) REFLECTIVE COLOR FILTER

(75) Inventor: Akihiko Takeda, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/352,989

(22) Filed: Jan. 29, 2003

(65) Prior Publication Data
US 2003/0169523 A1 Sep. 11, 2003

(30) Foreign Application Priority Data

Jan. 29, 2002 (JP) ........................................ 2002-020044

(51) Int. Cl.⁷ ................................................ G02B 5/22
(52) U.S. Cl. ............................ 359/885; 252/582; 430/7
(58) Field of Search ........................ 359/885; 252/582, 252/586; 430/7, 517; 353/84

(56) References Cited

U.S. PATENT DOCUMENTS

| | | | | | |
|---|---|---|---|---|---|
| 5,378,274 | A | * | 1/1995 | Yokoyama | .................. 106/410 |
| 5,395,678 | A | * | 3/1995 | Matsushima | ................. 428/201 |
| 6,278,507 | B1 | * | 8/2001 | Nakamura | .................. 349/106 |
| 2003/0003378 | A1 | * | 1/2003 | Yamashita | ..................... 430/7 |

* cited by examiner

*Primary Examiner*—Drew Dunn
*Assistant Examiner*—Leo Boutsikaris
(74) *Attorney, Agent, or Firm*—Sughrue Mion, PLLC

(57) ABSTRACT

The present invention is directed to a reflective color filter including a substrate having disposed thereon two or more kinds of patterned colored pixels exhibiting mutually different color hues, wherein at least one kind of the colored pixels is a green pixel that contains a green pigment and C.I. Pigment Yellow 138, a value y expressed in the x-y system is 0.37 or greater when chromaticity of the green pixel is measured with a D65 light source, and a value Y in the CIE 1931 color system is 87 or greater.

20 Claims, No Drawings

REFLECTIVE COLOR FILTER

BACKGROUND OF THE INVENTION

1. Field of the Invention

The present invention relates to a color filter, and more particularly, to a reflective color filter which has green pixels containing a green pigment and C.I. Pigment Yellow 138 and satisfies the requirements of both high color purity and high light transmittance.

2. Description of the Related Art

In recent years, displays to be mounted on portable terminals such as mobile telephones and game playing machines need to exhibit low electric power consumption. Because of this, reflective liquid crystal devices requiring no backlight are suitable for the displays used for the portable terminals. In order to realize low electric power consumption, it is suitable to decrease a concentration of pigment contained in colored pixels of a color filter. However, the decreased concentration of the pigment raises a problem in that color purity is lowered. Conversely, increased concentration of the pigment poses a problem in that light transmittance is lowered although color purity is improved.

Conventionally, among the colored pixels (normally red pixels, green pixels, and blue pixels) of a color filter, the green pixels contain, as a colored component, a combination of C.I. Pigment Green 36, which is a green pigment, and a yellow pigment mixed in a proper ratio.

As the yellow pigment, PY-139, PY-150 and the like are mainly used. However, when such yellow pigments have been used in reflective color filters, it has been difficult to fulfill the requirements of both low electric power consumption and high color purity.

SUMMARY OF THE INVENTION

The present invention has been accomplished in order to solve the problems associated with the prior art. Therefore, it is an object of the invention to provide a reflective color filter that displays high contrast, clear color tone and high light transmittance, realizes low electric power consumption, and has green pixels exhibiting high color purity.

The invention provides a reflective color filter comprising a substrate having disposed thereon two or more kinds of patterned colored pixels exhibiting mutually different color hues, wherein at least one kind of the colored pixels is a green pixel that contains a green pigment and C.I. Pigment Yellow 138, a value y expressed in the x-y system is 0.37 or greater when chromaticity of the green pixel is measured with a D65 light source, and a value Y in the CIE 1931 color system is 87 or greater.

DESCRIPTION OF THE INVENTION

A reflective color filter according to the present invention will be explained in detail below.

The reflective color filter according to the invention comprises a substrate having disposed thereon two or more kinds of patterned colored pixels exhibiting mutually different color hues, wherein at least one kind of the colored pixels is a green pixel that contains a green pigment and C.I. Pigment Yellow 138, a value y expressed in the x-y system is 0.37 or greater when chromaticity of the green pixel is measured with a D65 light source, and a value Y in the CIE 1931 color system is 87 or greater.

It is preferable that the green pixel comprise a colored photosensitive composition containing: a pigment dispersion composition that includes a green pigment, C.I. Pigment Yellow 138 and a resin; a polyfunctional monomer having two or more ethylenically unsaturated double bonds; and a photopolymerization initiator.

<Pigment Dispersion Composition>

The pigment dispersion composition to be incorporated in the colored photosensitive composition which forms the reflective color filter of the invention will be explained below.

In the invention, the pigment dispersion composition contains a green pigment, C.I. Pigment Yellow 138, and a resin.

—Pigments to be Incorporated in Green Pixels—

C.I. Pigment Yellow 138, that is a yellow pigment, is used as an essential component in the green pixels of the reflective color filter of the invention. C.I. Pigment Yellow 138 is used as a green colorant in combination with a green pigment in the green pixels. Specific examples of the green pigment that can suitably be used include C.I. Pigment Green 7, C.I. Pigment Green 36, and C.I. Pigment Green 37.

Use of the pigment dispersion composition that contains the C.I. Pigment Yellow 138, the green pigment and a resin makes it possible to obtain the green pixels which have a thin layer and a high light transmittance and fulfill the requirements of both low electric power consumption and high color purity.

The content of the green pigment in the pigment dispersion composition is preferably 5 to 20% by mass, and more preferably 8 to 18% by mass, based on a total mass of the pigment dispersion composition. The content of C.I. Pigment Yellow 138 in the pigment dispersion composition is preferably 5 to 20% by mass, and more preferably 8 to 18% by mass, based on a total mass of the pigment dispersion composition.

In the invention, although other yellow pigments than C.I. Pigment Yellow 138 may be used together, the content of C.I. Pigment Yellow 138 is preferably 99 to 10% by mass, and more preferably 90 to 50% by mass, based on the content of the yellow pigments other than C.I. Pigment Yellow 138 used together. As the proportion of the yellow pigment other than the C.I. Pigment Yellow 138 increases, light transmittance of the color filter may occasionally be lowered.

Suitable examples of the yellow pigment other than C.I. Pigment Yellow 138, that can be used together, include C.I. Pigment Yellow 2, C.I. Pigment Yellow 10, C.I. Pigment Yellow 12, C.I. Pigment Yellow 17, C.I. Pigment Yellow 20, C.I. Pigment Yellow 24, C.I. Pigment Yellow 55, C.I. Pigment Yellow 60, C.I. Pigment Yellow 65, C.I. Pigment Yellow 75, C.I. Pigment Yellow 83, C.I. Pigment Yellow 86, C.I. Pigment Yellow 87, C.I. Pigment Yellow 90, C.I. Pigment Yellow 93, C.I. Pigment Yellow 95, C.I. Pigment Yellow 99, C.I. Pigment Yellow 104, C.I. Pigment Yellow 109, C.I. Pigment Yellow 110, C.I. Pigment Yellow 114, C.I. Pigment Yellow 116, C.I. Pigment Yellow 117, C.I. Pigment Yellow 123, C.I. Pigment Yellow 125, C.I. Pigment Yellow 127, C.I. Pigment Yellow 137, C.I. Pigment Yellow 139, C.I. Pigment Yellow 147, C.I. Pigment Yellow 148, C.I. Pigment Yellow 150, C.I. Pigment Yellow 152, C.I. Pigment Yellow 153, C.I. Pigment Yellow 154, C.I. Pigment Yellow 156, C.I. Pigment Yellow 162, C.I. Pigment Yellow 165, C.I. Pigment Yellow 166, C.I. Pigment Yellow 168, C.I. Pigment Yellow 169, C.I. Pigment Yellow 180, C.I. Pigment Yellow 181, C.I. Pigment Yellow 182, C.I. Pigment Yellow 183, C.I. Pigment Yellow 185, C.I. Pigment Yellow 191, C.I. Pigment Yellow 193, etc.

Among the above listed pigments, C.I. Pigment Yellow 139, C.I. Pigment Yellow 150, and C.I. Pigment Yellow 180 are more preferable.

The content of the green pigment is preferably 90 to 10% by mass, and more preferably 80 to 20% by mass, relative to the yellow pigment (a total of C.I. Pigment Yellow 138 and other yellow pigments to be used together).

—Resin—

The resin to be incorporated in the pigment dispersion composition is preferably a polymer having an acidic group. Use of the polymer having an acidic group as the resin is preferable because the polymer imparts steric repulsion to the pigment and thus improves dispersion stability of the pigment and enhances developability with alkali when the dispersion is used as the colored photosensitive composition. Examples of the polymer having an acidic group include a (meth)acrylic acid/(meth)acrylic ester copolymer, a styrene/maleic anhydride copolymer, a reaction product between a styrene/maleic anhydride copolymer and an alcohol, etc. The polymer may be used singly or in combination of two or more kinds thereof. Among the above-mentioned polymers, preferred is a polymer that is excellent in pigment dispersibility, excellent in compatibility with a polyfunctional monomer and a photopolymerization initiator, and has a suitable degree of solubility in an alkaline developing solution, a sufficient solubility in an organic solvent, strength, softening temperature, etc. when the polymer is used in the colored photosensitive composition. Specifically, a (meth)acrylic acid/(meth)acrylic ester copolymer (e.g., a methacrylic acid/benzyl methacrylate copolymer) is preferable.

The acid value of the polymer having an acidic group is preferably 60 to 130, and more preferably 90 to 120. It is preferable to employ the acid value within the above-specified range because the acid value in this range provides good dispersion stability and reduced viscosity. The unit of the acid value is expressed by milligrams of potassium hydroxide required for neutralizing 1 g of the polymer. The acid value of the polymer can be adjusted by the molar ratio of monomers that constitute the polymer.

The weight average molecular weight of the polymer having an acidic group is preferably 5,000 to 200,000. If the weight average molecular weight is less than 5,000, the film formation by coating may be impaired when the polymer is used in the colored photosensitive composition. On the other hand, the viscosity of the colored photosensitive composition may be increased if the weight average molecular weight exceeds 200,000.

Although the preferable content of the resin in the pigment dispersion composition varies depending on the kinds of the resins used, normally the range is preferably 10 to 200 parts by mass, and more preferably 20 to 150 parts by mass, based on 100 parts by mass of the pigment. The above-specified range is preferable because such a content of the resin makes it possible to impart steric repulsive effect to the pigment and prevent the viscosity of the dispersion from excessively rising.

—Dispersant—

It is preferable that the pigment dispersion composition used in the invention further contains a dispersant. The dispersant to be used in the invention is preferably a compound having a dye skeleton, and more preferably a compound having an azo dye skeleton. In particular, it is preferable that the dispersant is a compound represented by the general formula (I) shown below.

When this dispersant is used, the dispersant is adsorbed onto the surface of the pigment particles due to the nitrogen atom, whereby the surface of the pigment particles is covered with the dispersant. Such a state prevents the pigment particles from being adsorbed to each other and makes it difficult for the pigment particles to aggregate. As a result, the pigment particles are uniformly dispersed in the form of fine particles to thereby improve pigment dispersibility.

   General Formula (I)

In the general formula (I), A represents a group capable of forming an azo dye. The group A may be selected arbitrarily insofar as it is a group capable of forming the azo dye by coupling with a diazonium.

Specific examples of the group A are given below, though it should be understood that the invention is not restricted thereto.

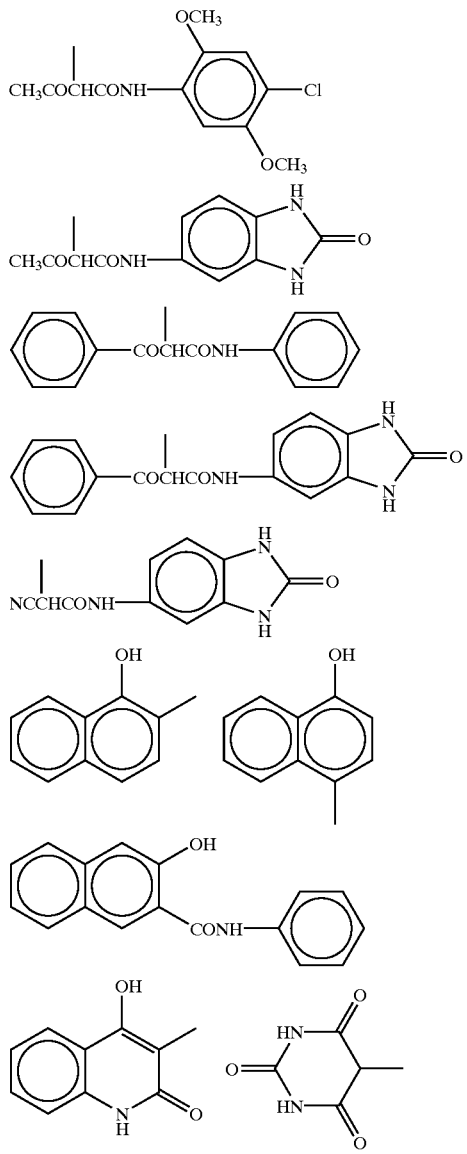

-continued

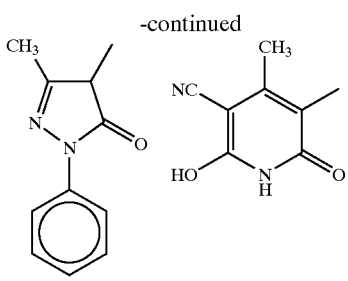

In the general formula (I), X represents a single bond (meaning that Y is linked directly to —N=N—) or a group selected from bivalent linking groups having the following structural formulae.

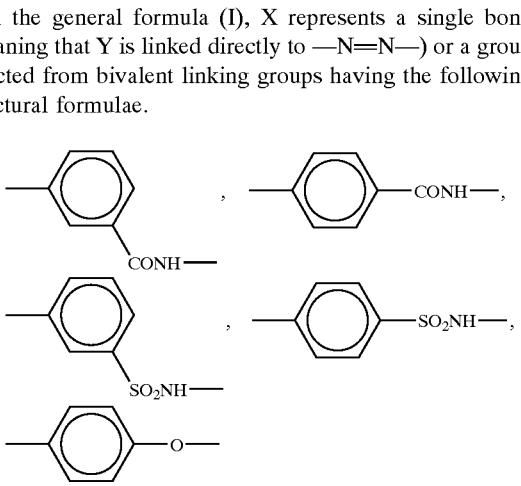

In the general formula (I), Y represents a group represented by the following general formula (II).

General Formula (II)

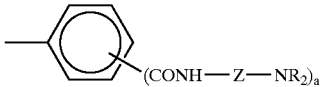

In the general formula (II), Z represents a lower alkylene group. Z is indicated as —$(CH_2)_b$—, wherein b represents an integer of 1 to 5, and preferably represents 2 or 3.

In the general formula (II), —$NR_2$ represents a lower alkyl amino group or a 5- or 6-membered saturated heterocycle containing a nitrogen atom. In the case where the —$NR_2$ represents a lower alkyl amino group, it is indicated as —$N(C_nH_{2n+1})_2$, wherein n represents an integer of 1 to 4, and preferably represents 1 or 2. On the other hand, in the case where the —$NR_2$ represents a 5- or 6-membered saturated heterocycle containing a nitrogen atom, preferable is one of the heterocycles represented by the following structural formulae.

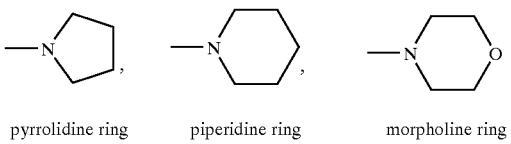

pyrrolidine ring    piperidine ring    morpholine ring

In the general formula (II) shown above, Z and —$NR_2$ may each have a lower alkyl group or alkoxy group as the substituent.

In the general formula (II), a represents 1 or 2, and preferably 2.

Specific examples of the compound represented by the general formula (I) are given below (1 to 22), however, it should be understood that the invention is not restricted thereto.

1.

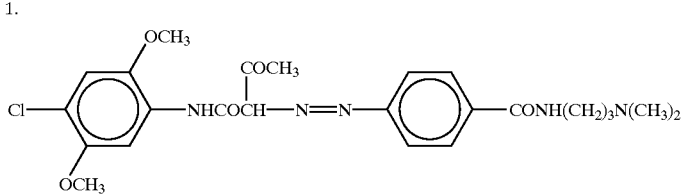

2.

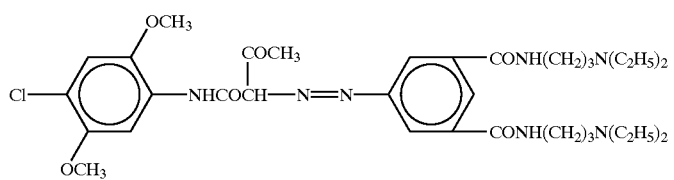

3.

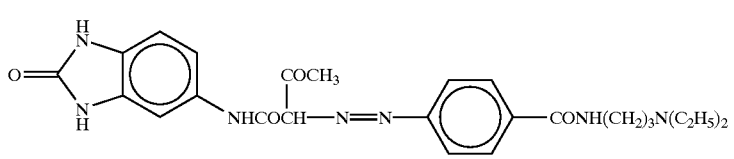

-continued
4.
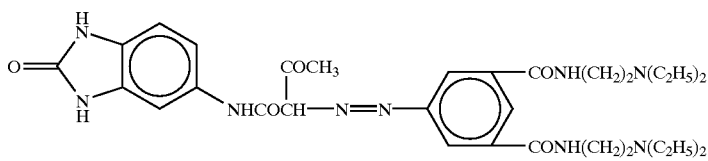
5.
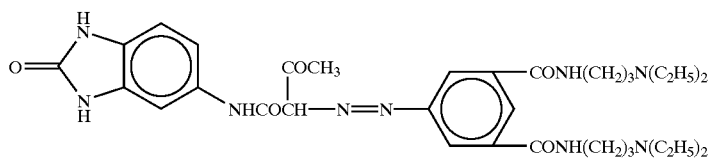
6.
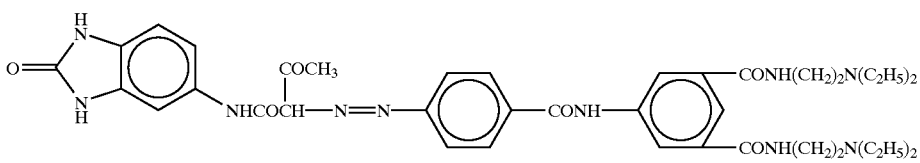
7.
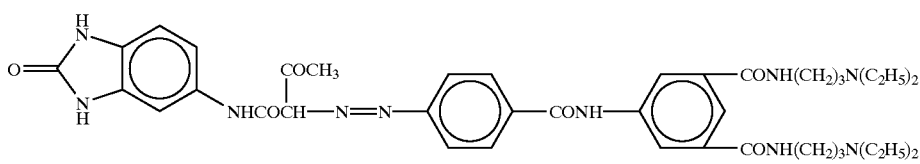
8.
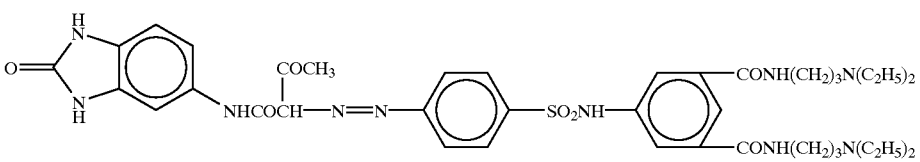
9.
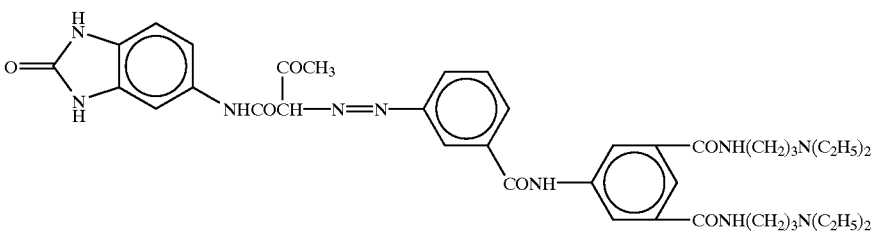
10.
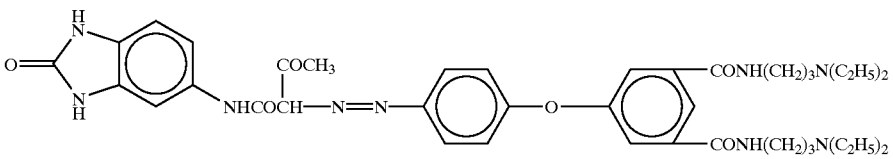
11.
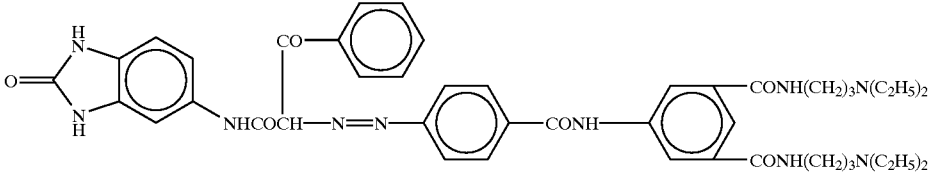

-continued
12.
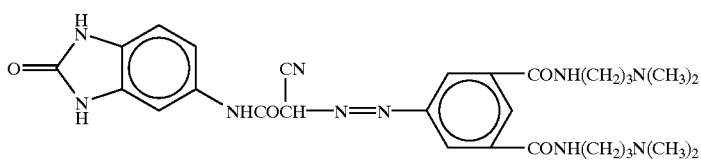
13.
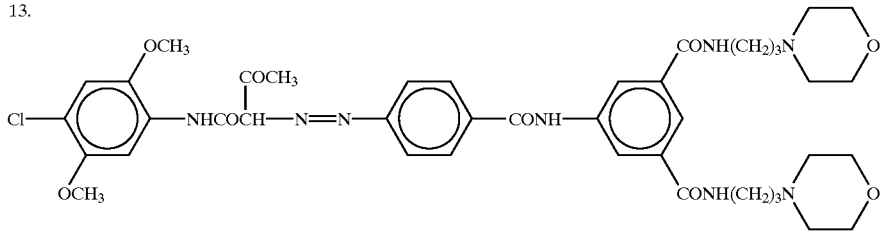
14.
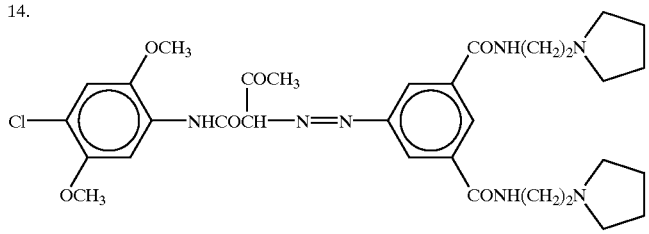
15.
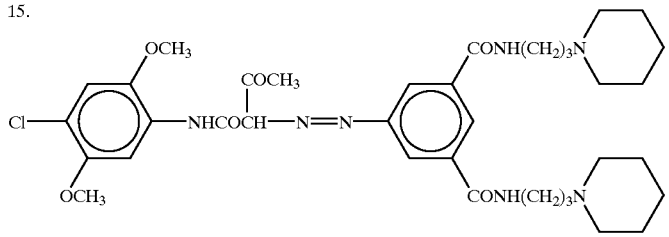
16.
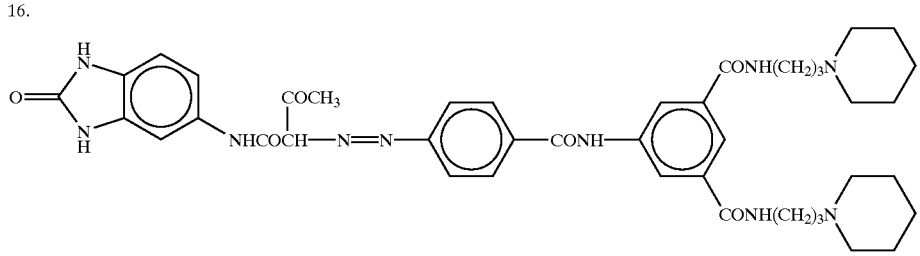
17.
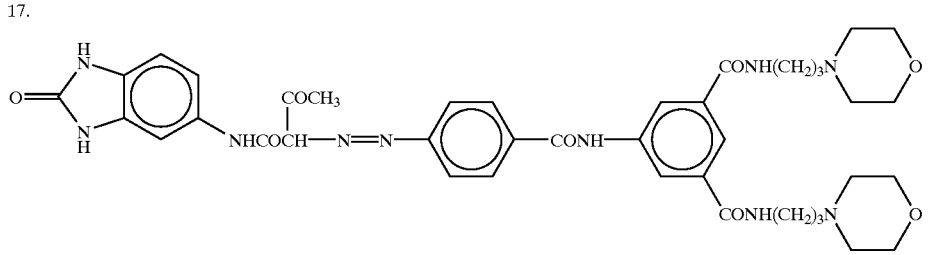
18.
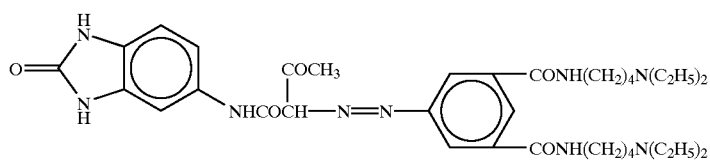

19.

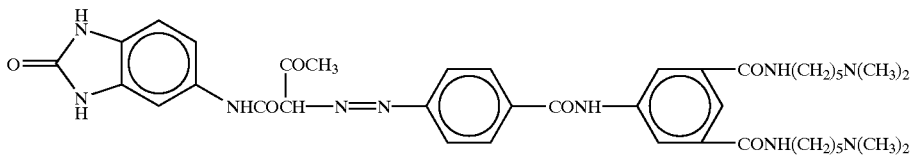

20.

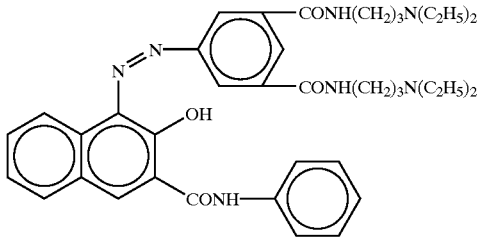

21.

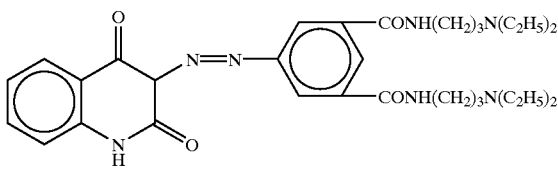

22.

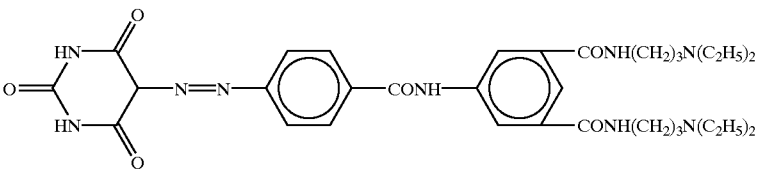

It is preferable to use an amine compound represented by the general formula (III) and/or an amine compound represented by the general formula (IV) described in columns 0038 to 0043 of Japanese Patent Application Laid-Open (JP-A) No.2000-239554 together with a compound represented by the general formula (I).

The compound represented by the general formula (I) can be synthesized according to the methods described in columns 0033 to 0035 of JP-A No.2000-239554.

Alternatively, commercially available compounds may be used as the compound represented by the general formula (I). Examples of the commercially available compounds include "Solsperse 22000" manufactured by ABINA Corporation.

The preferable content of the dispersant in the pigment dispersion composition used in the invention varies depending on the kinds of the dispersants used. Usually, the content is preferably in a range of 0.1 to 100 parts by mass, and more preferably in a range of 1 to 30 parts by mass, based on 100 parts by mass of the pigment. The above-specified range is preferable because chromaticity adjustment becomes easier when manufacturing the color filter, etc. while preventing the viscosity of the pigment dispersion composition from excessively rising.

—Other Components—

The pigment dispersion composition relating to the invention may contain other components such as a surfactant, as necessary. It is preferable that the pigment dispersion composition contains a surfactant because the surfactant provides a further improvement in dispersion stability of the pigment. Examples of the surfactant include anionic surfactants such as alkylnaphthalenesulfonate or a salt of phosphoric acid ester, cationic surfactants such as a salt of amine, amphoteric surfactants such as an aminocarboxylic acid, a betaine type.

—Pigments Contained in Colored Pixels Other than Green Pixels—

Examples of the pigments that can be used in colored pixels other than the green pixels include the following organic pigments. Examples of these pigments include yellow pigments, orange pigments, red pigments, violet pigments, blue pigments, green pigments, brown pigments, black pigments, etc.

In the case where the dispersant is a compound having an azo dye skeleton (e.g., a compound represented by the general formula (I)), it is preferable that the pigment to be used together is also a pigment having an azo dye skeleton.

It is also preferable to use C.I. Pigment Yellow 138 as the yellow pigment in colored pixels other than the green pixels. Suitable examples of the yellow pigment other than C.I. Pigment Yellow 138, that can be used together, include C.I. Pigment Yellow 2, C.I. Pigment Yellow 10, C.I. Pigment Yellow 12, C.I. Pigment Yellow 17, C.I. Pigment Yellow 20, C.I. Pigment Yellow 24, C.I. Pigment Yellow 55, C.I. Pigment Yellow 60, C.I. Pigment Yellow 65, C.I. Pigment Yellow 75, C.I. Pigment Yellow 83, C.I. Pigment Yellow 86, C.I. Pigment Yellow 87, C.I. Pigment Yellow 90, C.I. Pigment Yellow 93, C.I. Pigment Yellow 95, C.I. Pigment Yellow 99, C.I. Pigment Yellow 104, C.I. Pigment Yellow 109, C.I. Pigment Yellow 110, C.I. Pigment Yellow 114, C.I.

Pigment Yellow 116, C.I. Pigment Yellow 117, C.I. Pigment Yellow 123, C.I. Pigment Yellow 125, C.I. Pigment Yellow 127, C.I. Pigment Yellow 137, C.I. Pigment Yellow 139, C.I. Pigment Yellow 147, C.I. Pigment Yellow 148, C.I. Pigment Yellow 150, C.I. Pigment Yellow 152, C.I. Pigment Yellow 153, C.I. Pigment Yellow 154, C.I. Pigment Yellow 156, C.I. Pigment Yellow 162, C.I. Pigment Yellow 165, C.I. Pigment Yellow 166, C.I. Pigment Yellow 168, C.I. Pigment Yellow 169, C.I. Pigment Yellow 180, C.I. Pigment Yellow 181, C.I. Pigment Yellow 182, C.I. Pigment Yellow 183, C.I. Pigment Yellow 185, C.I. Pigment Yellow 191, C.I. Pigment Yellow 193, etc.

Examples of the orange pigment include C.I. Pigment Orange 36, C.I. Pigment Orange 43, C.I. Pigment Orange 51, C.I. Pigment Orange 55, C.I. Pigment Orange 59, C.I. Pigment Orange 61, C.I. Pigment Orange 71, etc.

Examples of the red pigment include C.I. Pigment Red 9, C.I. Pigment Red 97, C.I. Pigment Red 122, C.I. Pigment Red 123, C.I. Pigment Red 149, C.I. Pigment Red 168, C.I. Pigment Red 177, C.I. Pigment Red 180, C.I. Pigment Red 192, C.I. Pigment Red 215, C.I. Pigment Red 216, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 240, C.I. Pigment Red 242, C.I. Pigment Red 48:1, C.I. Pigment Red 209, C.I. Pigment Red 146, C.I. Pigment Red 11, C.I. Pigment Red 81, C.I. Pigment Red 213, C.I. Pigment Red 272, C.I. Pigment Red 270, C.I. Pigment Red 255, C.I. Pigment Red 264, C.I. Pigment Red 254, C.I. Pigment Red 207, etc.

Examples of the violet pigment include C.I. Pigment Violet 19, C.I. Pigment Violet 23, C.I. Pigment Violet 29, C.I. Pigment Violet 30, C.I. Pigment Violet 37, C.I. Pigment Violet 40, C.I. Pigment Violet 50, etc.

Examples of the blue pigment include C.I. Pigment Blue 15, C.I. Pigment Blue 15:6, C.I. Pigment Blue 22, C.I. Pigment Blue 60, C.I. Pigment Blue 64, etc.

Examples of the green pigment include C.I. Pigment Green 7, C.I. Pigment Green 36, etc.

Examples of the brown pigment include C.I. Pigment Brown 23, C.I. Pigment Brown 25, C.I. Pigment Brown 26, etc. Examples of the black pigment include C.I. Pigment Black 7, etc.

These pigments may be used singly or in combination of two or more thereof. Among these pigments, Pigment Red 209 and Pigment Red 207 are preferable for use in red pixels; and Pigment Blue 15, etc. are particularly preferable for use in blue pixels in the reflective color filter of the invention.

The preferable content of the pigment in the pigment dispersion composition used in the invention varies depending on the kinds of the pigments used. Usually, the content of the pigment is preferably in a range of 5 to 80% by mass, and more preferably in a range of 10 to 70% by mass. The above-specified range is preferable because the viscosity of the composition is prevented from excessively rising while sufficiently maintaining the tinting power.

—Preparation of the Pigment Dispersion Composition—

The pigment dispersion composition can be prepared by dispersing the pigment, the resin and the dispersant together with a solvent using a dispersing machine such as a sand mill.

For the preparation, there may be employed a process in which the pigment and the dispersant are mixed together in advance and subjected to a pulverizing treatment and the resultant mixture is dispersed in an organic solvent (or a vehicle); a process in which the pigment and the dispersant or the like are separately subjected to a pulverizing treatment and then dispersed or dissolved in an organic solvent (or a vehicle) and the obtained dispersions or solutions are mixed together; or a process in which the pigment and the dispersant, each after being pulverized, are added separately to an organic solvent (or a vehicle) and then dispersed. In particular, a process in which the pigment and the dispersant are pulverized in advance simultaneously or separately is preferable.

The term "vehicle" as used herein refers to a medium in which the pigment is dispersed when a coating material is in the state of a liquid. Besides the organic solvent, the vehicle encompasses a component (a binder resin) which is a liquid capable of combining with the pigment to solidify the coated layer.

The dispersing machine used for dispersing in an organic solvent the pulverized pigment and the dispersant is not particularly limited. Examples of the dispersing machine include conventionally known machines such as a kneader, roll mill, attritor, super mill, dissolver, homomixer, sand mill, etc.

In the pigment dispersion composition used in the invention, the organic solvent for dispersing the dispersant, the pigment and the resin is not particularly limited and may be selected appropriately from conventionally known solvents. Examples of the solvent include (poly)alkylene glycol monoalkyl ethers such as ethylene glycol monomethyl ether, ethylene glycol monoethyl ether, propylene glycol monomethyl ether, propylene glycol monoethyl ether, diethylene glycol monomethyl ether, ethylene glycol monoethyl ether, etc. as well as acetic acid esters thereof; acetic esters such as ethyl acetate, n-propyl acetate, i-propyl acetate, n-butyl acetate, i-butyl acetate, etc.; aromatic hydrocarbons such as benzene, toluene, xylene, etc.; ketones such as methyl ethyl ketone, acetone, methyl isobutyl ketone, cyclohexanone, etc.; and alcohols such as ethanol, propanol, butanol, hexanol, cyclohexanol, ethylene glycol, diethylene glycol, glycerin, etc. These solvents may be used alone or in admixture thereof. Among these solvents, alkylene glycol monoalkyl ethers and the acetic esters thereof, acetic esters, methyl ethyl ketone, etc. are preferable.

Usually, the content of the organic solvent in the pigment dispersion composition is in a range of 10 to 1,000 parts by mass, preferably in a range of 20 to 500 parts by mass, based on 100 parts by mass of the pigment. The above-specified range is preferable because the viscosity of the pigment dispersion composition is prevented from excessively increasing and further it is not difficult to insure a space for storing the pigment dispersion composition.

In the invention, it is preferable that the average particle diameters each of the pigment and the dispersant are specified to be not greater than 100 nm. In order to achieve the particle diameters of the pigment and the dispersant falling within the above-mentioned range, the employable process includes dispersing the pigment and the dispersant using a high-speed sand mill or the like for a long time so as to grind primary particles concurrently. This process is, however, associated with a problem that a large amount of energy is required, and in general the fine pigment particles and dispersant obtained by such a process tend to cause slight aggregation, generally called flocculation, and the dispersion tends to become highly viscous and thixotropic. As a result, it is difficult to obtain a uniform coated layer of the color filter by this process. Therefore, a process in which the pigment and the dispersant are each pulverized to grind primary particles and then dispersed is preferable.

The pigment and the dispersant may be pulverized simultaneously or separately. From the standpoint of increased producibility, it is preferable that the pulverizing treatment is carried out simultaneously under the conditions where the pigment and the dispersant are co-existent. Examples of the pulverizing methods include a method (i.e., milling method) in which the pigment and the dispersant are mechanically ground so as to decrease the particle diameters; a method (i.e., depositing method) including dissolving the pigment and the dispersant in a good solvent and pouring the resulting solution in a poor solvent so as to deposit the pigment and the dispersant having decreased particle diameters; and a method (i.e., synthesizing and depositing method) in which particles having small particle diameters are produced at the time of synthesis. Depending on the synthesizing methods and the chemical properties of the pigment and the dispersant used, a suitable method can be selected for pulverization. Two or more of the methods may be selected for pulverization. Besides, in the case where the pigment and the dispersant are pulverized separately, the pigment and the dispersant may each be subjected to mutually different pulverizing methods.

The milling method is based on pulverization of primary particles through the steps of grinding the pigment and/or the dispersant together with grinding media such as a common salt using a ball mill, a sand mill, a kneader, or the like and removing the grinding media after the grinding process. This method makes it possible to obtain relatively uniform dispersed particles of the pigment and/or the dispersant.

The depositing method includes dissolving the pigment and/or the dispersant in a suitable good solvent and mixing the resulting solution with a poor solvent so as to deposit fine crystalline particles. The sizes of primary particles can be controlled by the kinds and the amounts of the solvents used, depositing temperatures, depositing rates, etc. Examples of the solvent to be used include strongly acidic solvents such as concentrated sulfuric acid, polyphosphoric acid, chlorosulfonic acid, or the like and basic solvents such as liquid ammonia, a dimethylformamide solution containing sodium methylate, or the like.

A leuco method is adopted as a specific depositing method. Pigments based on vat dyes, such as a flavanthrone-based dye, a perinone-based dye, a perylene-based dye or an indanthron-based dye, turn water-soluble when reduced by alkaline hydrosulfite, because the quinone group forms a sodium salt of hydroquinone (a leuco compound). If this solution is oxidized by adding thereto a suitable oxidizing agent, fine particles of the pigment and dispersant can be deposited.

The synthesizing and depositing method is a method in which fine crystalline particles are deposited simultaneously with synthesis of the pigment and/or the dispersant. Normally, this method is applied to a pigment such as an azo-based pigment that is synthesized in an aqueous system in which secondary flocculation tends to occur because filtration used in an ordinary separating method is difficult to conduct unless the particles are in the state of secondary particles having larger particle diameters as a result of flocculation when the produced fine particles of the pigment and/or the dispersant are separated from the solvent.

Although any of the methods described above may be employed for pulverization, a milling method is preferably adopted because materials are relatively not restricted through the milling method. Details of the milling method are as follows. According to this method, fine primary particles of the pigment and the dispersant are obtained through the steps of mechanically kneading the pigment and the dispersant with a water-soluble inorganic salt such as a common salt and a water-soluble organic solvent incapable of dissolving the water-soluble inorganic salt (this step is hereinafter referred to as salt milling), removing the inorganic salt and the organic solvent, washing with water, and drying the resultant product. Through the salt milling treatment, crystal growth of the pigment and the dispersant may occur in some cases. Therefore, in order to prevent the crystal growth, it is effective to add thereto a solid resin or a pigment dispersant, which is at least partially soluble in the organic solvent, when the salt milling treatment is carried out.

The ratio of the pigment and the dispersant to the inorganic salt is as follows. As the proportion of the inorganic salt increases, the pulverizing efficiency of the pigment and the dispersant becomes better, but the producibility decreases because the treated amount of the pigment and the dispersant decreases. Normally, it is advantageous to use 1 to 20 parts by mass, preferably 2 to 10 parts by mass, of the inorganic salt relative to 1 part by mass of the pigment and the dispersant. Further, a wetting agent is added so that the pigment and the dispersant can form a homogeneous mass with the inorganic salt. Although the amount of the wetting agent added varies depending on the ratio of the pigment and the dispersant to the inorganic salt, the amount of the wetting agent is usually in a range of 50 to 300% by mass of the pigment.

The salt milling procedure is described in more detail. A small amount of a water-soluble organic solvent as the wetting agent is added to a mixture of the pigment, the dispersant, and the water-soluble inorganic salt. The resultant mixture is well kneaded using a kneader or the like. After that, the mixture is poured in water and stirred by a high-speed mixer or the like to form a slurry. The obtained slurry is filtered, washed with water, and then dried. In such a manner, the pigment and/or dispersant whose primary particles have been pulverized can be obtained.

The pigment dispersion composition use in the invention can be employed as a coating material, a printing ink, etc. In addition, image formation can be conducted by, for example, a process including applying a coating liquid containing the pigment dispersion composition to a support and drying the coating layer to form a layer of the pigment dispersion composition, or alternatively, transferring the layer of the pigment dispersion composition formed on a temporary support to a support, forming on this layer a layer of a conventionally known positive or negative photosensitive resin composition, and subjecting the formed layer to light exposure and development so that the photosensitive resin composition in an unexposed region is removed together with the layer of the pigment dispersion composition in the same region. Alternatively, if the pigment dispersion composition is mixed with a photosensitive composition, the mixture can be used as the colored photosensitive composition capable of producing images by irradiation with light, which will be described later.

Colored Photosensitive Composition

The reflective color filter of the invention comprises a colored photosensitive composition that contains the pigment dispersion composition, a polyfunctional monomer having two or more ethylenically unsaturated double bonds, and a photopolymerization initiator.

The colored photosensitive composition used in the invention is excellent in color and in dispersion stability of pigment since the colored photosensitive composition contains the pigment dispersion composition. In particular, when the colored photosensitive composition is utilized in manufacturing of a color filter, it is possible to produce a color filter having clear color, high-contrast, a small film thickness, and exhibiting both high color purity and high transmittance in a stable manner.

—Polyfunctional Monomer—

Examples of the polyfunctional monomer having two or more ethylenically unsaturated double bonds include conventionally known (meth)acrylic acid esters, urethane (meth)acrylates, (meth)acrylic amides, allyl compounds, vinyl esters, etc., described in, for example, JP-A No.60-258539. These may be used singly or in combination of two or more thereof. Among these monomers, (meth)acrylic esters are preferable.

The preferable content of the polyfunctional monomer having ethylenically unsaturated double bonds in the colored photosensitive composition is in a range of 10 to 60% by mass based on a total solid content. The above-specified range is preferable because the monomer contained in such an amount does not inhibit other materials from exhibiting respective abilities while sufficiently maintaining curability of the composition when exposed to light.

—Photopolymerization Initiator—

It is preferable that the photopolymerization initiator contains at least one compound whose molecular absorptivity coefficient at wavelengths of about 300 to 500 nm is at least about 50. Examples of the compound include aromatic ketones, lophine dimer, benzoin, benzoin ethers, polyhalogens, etc. as described in JP-A Nos. 2-48664, 1-152449 and 2-153353. These may be used singly or in combination of two or more thereof. Among these compounds, preferable are a combination of 4,4'-bis (diethylamino)benzophenone and 2-(o-chlorophenyl)-4,5-diphenylimidazole dimer, and 4-[p-N,N-di (ethoxycarbonylmethyl)-2,6-di(trichloromethyl)-s-triazine.

The preferable content of the photopolymerization initiator in the colored photosensitive composition is in a range of 0.2 to 10% by mass based on a total solid content of the colored photosensitive composition. The above-specified range is preferable because exposure sensitivity is prevented from being excessively elevated too high to control while sufficiently maintaining the exposure sensitivity.

The colored photosensitive composition can be prepared by blending the pigment dispersion composition, the polyfunctional monomer having two or more ethylenically unsaturated double bonds, and the photopolymerization initiator. A resin may be added to the composition. As described above, the resin is preferably a polymer having an acidic group that is usable in the pigment dispersion composition. More preferably, the resin is the same resin as that used in the preparation of the pigment dispersion composition.

The preferable content of the resin (particularly the polymer having an acidic group) in the colored photosensitive composition used in the invention is in a range of about 20 to 80% by mass based on a total solid content. The above-specified range is preferable because other materials are not inhibited from exhibiting respective abilities while sufficiently maintaining the strength of the coated layer.

The colored photosensitive composition can be used for image formation by irradiation with light. The color image formation using the colored photosensitive composition can be carried out basically according to the following steps (1) to (3).

(1) A step in which the pigment dispersion composition is prepared and thereafter, by using it, the colored photosensitive composition is prepared;

(2) A step in which a layer containing the colored photosensitive composition is formed by applying the colored photosensitive composition to a substrate and subsequently drying, or alternatively, by transferring to a substrate the layer of the colored photosensitive composition formed by applying the colored photosensitive composition to a temporary support and subsequently drying; and (3) A step in which the layer containing the colored photosensitive composition provided on the substrate is exposed to light and then developed to form patterns.

Usually, a transparent material such as glass plate, transparent plastic plate, or the like is used as the substrate. In order to improve adhesion between the substrate and the colored photosensitive composition, a variety of commercially available silane coupling agents may be added to the colored photosensitive composition, or alternatively, the substrate may be subjected to a coupling treatment beforehand.

The application of the coating liquid of the colored photosensitive composition to the substrate can be carried out by using conventionally known coating means such as a spin coater, a roll coater, a bar coater, a curtain coater, or the like.

Preferable examples of the method for transferring to the substrate the layer containing the colored photosensitive composition formed on a temporary support include a method using a heat roll laminator under normal pressure or under reduced pressure.

Examples of the developing solution used in the development include an aqueous solution of a hydroxide, carbonate or hydrogencarbonate of an alkali metal or an alkaline earth metal, ammonia water, an aqueous solution of a quaternary ammonium salt. These may be used singly or in combination of two or more. Among these compounds, an aqueous solution of sodium carbonate is particularly preferable.

<Chromaticity of Green Pixels>

The reflective color filter of the invention comprises a substrate having disposed thereon two or more kinds of patterned colored pixels exhibiting mutually different color hues, wherein at least one kind of the colored pixels is the green pixel described supra, and a value y expressed in the x-y system is 0.37 or greater when chromaticity of the green pixel is measured with a D65 light source. The value y is preferably in a range of 0.37 to 0.40. If the value y is less than 0.37, although the transmittance improves, the density of green color decreases and color purity of the resulting color filter is lowered. The term "measured with a D65 light source" means that the chromaticity of white color as a standard was measured under CIE D65 (6504K) which is an international standard of standard daylight.

The term "value y expressed in the x-y system where chromaticity is measured with a D65 light source" means obtaining the tristimulus values X, Y, and Z in the CIE 1931 color system (XYZ color system) and applying these values to the following formulae.

$x=X/(X+Y+Z)$ $y=Y/(X+Y+Z)$

Specifically, the value y expressed in the x-y system where chromaticity is measured with a D65 light source can be obtained by carrying out the measurement using OSP-SP100 (manufactured by Olympus Optical Co., Ltd.) as the measuring apparatus.

Reflective Color Filter

The reflective color filter of the invention comprises a substrate having disposed thereon two or more kinds of patterned colored pixels exhibiting mutually different color hues, wherein at least one kind of the colored pixels is the green pixel described above, and the value y expressed in the x-y system is 0.37 or greater when chromaticity of the green pixel is measured with a D65 light source. It is preferable that the reflective color filter of the invention normally has red pixels and blue pixels besides the green pixels. Further, the reflective color filter of the invention is characterized in that the value Y, which is one of the tristimulus values X, Y, and Z in the CIE 1931 color system (XYZ color system) and indicates the visual reflectance of the green pixel (a value correlating with lightness of color), is 87 or greater. That is, if the value Y is lower than 87, it is impossible to reduce electric power consumption because higher electric power consumption is necessary for enhancing lightness.

The reflective color filter of the invention can be manufactured by repeating the steps (2) and (3) of the above-described process for forming color images using the colored photosensitive composition and combining patters of plural colors (normally 3 colors of R, G, and B).

The reflective color filter of the invention can also be manufactured using a transferring method. Details of the methods for manufacturing color filters using the transferring method are described in, for example, JP-A Nos. 4-208940, 5-72724, 5-80503, 5-173320, etc. These methods can be applied to production of the reflective color filter of the invention.

The reflective color filter of the invention includes a construction in which the above-described colored layers are formed directly on a transparent substrate such as glass, a construction in which the above-described colored layers are formed on a substrate having disposed thereon an active element such as TFT (color filter on array: COA construction), etc.

In the reflective color filter of the invention, the layer containing the colored photosensitive composition (colored layer) has a film thickness preferably in a range of 0.7 to 3.0 μm, and more preferably in a range of 0.8 to 2.0 μm. In order to secure flatness of the layer, it is preferable that the film thickness is within the above-mentioned range.

The reflective color filter of the invention can be widely utilized as the display element including displays to be mounted on portable terminals such as mobile telephones and game playing machines.

EXAMPLES

The present invention will now be fully described with reference to the following examples, but it is to be understood that the invention is not limited to the examples.

—Preparation of a Pigment Dispersion Composition (1)—

A yellow pigment dispersion composition (1) having the following composition was prepared.

[Composition]

| | |
|---|---|
| C.I. Pigment Yellow 138 | 6.4 g |
| Pigment dispersant 1 described below | 0.6 g |
| Methacrylic acid/benzyl methacrylate copolymer | 15.8 g |
| (molar ratio: 28/72, weight average molecular weight: 30,000, 40% 1-methoxy-2-propyl acetate solution, acid value: 105) | |
| 1-methoxy-2-propyl acetate | 57.2 g |

The pigment and pigment dispersant 1 were subjected to the salt milling treatment (pulverizing treatment) described below and then used for the preparation of the composition.

500 g of sodium chloride, 5 g of hydrogenated rosin ester (trade name: Ester Gum HP, manufactured by Arakawa Chemical Industries, Ltd.), 50 g of C.I. Pigment Yellow 138, 50 g of the pigment dispersant 1 indicated below, and 300 g of polyethylene glycol were kneaded using an open kneader (trade name: S1-1, manufactured by Moriyama Manufacturing Co., Ltd.) for 5 hours. The thus kneaded product was charged in 2 liters of warm water and vigorous stirring was provided using a dissolver at about 70° C. for 2 hours. Then, the obtained dispersion was filtered and the residue remained on the filter was washed with water to remove sodium chloride and polyethylene glycol. The resultant product was dried in a dry oven at about 40° C. for 2 days.

Pigment dispersant 1

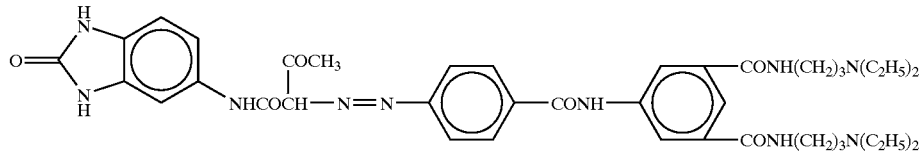

The yellow pigment composition having the composition described above was dispersed by means of a motor mill M-50 (manufactured by Eiger Corporation) using zirconia beads having a diameter of 0.65 mm at a peripheral speed of 9 m/s for 9 hours, to thereby prepare the pigment dispersion composition (1).

—Preparation of a Pigment Dispersion Composition (2)—

A yellow pigment dispersion composition (2) was prepared in the same manner as in the preparation of the pigment dispersion composition (1), except that the pigment dispersant 1 was replaced with the following pigment dispersant 2.

Pigment disperant 2

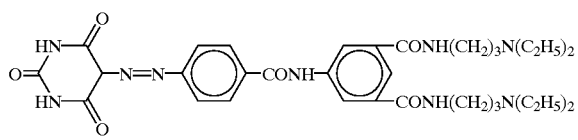

—Preparation of a Comparative Pigment Dispersion Composition (1)—

A yellow comparative pigment dispersion composition (1) was prepared in the same manner as in the preparation of the pigment dispersion composition (1), except that C.I. Pigment Yellow 138 was replaced with C.I. Pigment Yellow 139.

—Preparation of a Comparative Pigment Dispersion Composition (2)—

A yellow comparative pigment dispersion composition (2) was prepared in the same manner as in the preparation of the pigment dispersion composition (1), except that the salt milling treatment was not conducted.

—Evaluation of Pigment Dispersion Compositions—

The yellow pigment dispersion compositions (1) to (2) and the comparative pigment dispersion compositions (1) to (2) were measured for the following properties. The results of the measurements are shown in Table 1.

—Measurement of Viscosity—

The obtained pigment dispersion compositions were measured for viscosity using a E-type viscometer so as to evaluate an increase in the viscosity.

—Measurement of Contrast—

The pigment dispersion compositions obtained as above were applied to a glass substrate to give a layer thickness of 6 $\mu$m to thereby produce respective samples. The samples were placed between 2 polarizing plates and the amounts of the transmitted light were measured in two cases: when the axes of polarization were parallel; and when the axes of polarization were vertical to each other. The ratio between the two cases of the amounts of the transmitted light was defined as the contrast (reference was made to "The 7th Color Optics Conference, 1970, 512 Color System 10.4" size TFT-LCD Color Filter, Ueki, Ozeki, Fukunaga, Yamanaka").

TABLE 1

|  | Viscosity (mPa · s) | Contrast |
| --- | --- | --- |
| pigment dispersion composition (1) | 12.0 | 1450 |
| pigment dispersion composition (2) | 25.7 | 1350 |
| Comparative pigment dispersion composition (1) | 70.6 | 1250 |
| Comparative pigment dispersion composition (2) | 40.8 | 650 |

From the results shown in Table 1, it can be seen that the pigment dispersion compositions (1) and (2) each exhibit a low viscosity and excellent dispersion stability and provides a high contrast.

Meanwhile, a pigment dispersion composition was prepared in the same manner as in the preparation of the pigment dispersion composition (1), except that a copolymer having an acid value of 50 (a copolymer of methacrylic acid/benzyl methacrylate at a molar ratio of 14/86) was used as the methacrylic acid/benzyl methacrylate copolymer. The pigment dispersion composition thus prepared had a viscosity slightly higher than that of the pigment dispersion composition (1) and exhibited poorer dispersibility. Similarly, a pigment dispersion composition was prepared in the same manner as in the preparation of the pigment dispersion composition (1), except that a copolymer having an acid value of 145 (a copolymer of methacrylic acid/benzyl methacrylate at a molar ratio of 37/63) was used as the methacrylic acid/benzyl methacrylate copolymer. The pigment dispersion composition thus prepared had a viscosity slightly higher than that of the pigment dispersion composition (1) and exhibited poorer dispersibility.

Example 1

A colored photosensitive composition A was prepared by blending the following components for manufacturing of a color filter.

[Composition]

| | |
| --- | --- |
| Yellow pigment dispersion composition (1) described above | 6.01 g |
| C.I. Pigment Green 36 dispersion (GT-2 manufactured by Fuji Film Olin Co., Ltd.) | 8.01 g |
| Methacrylic acid/benzyl methacrylate copolymer (molar ratio: 28/72, weight average molecular weight: 30,000, 30% 1-methoxy-2-propyl acetate solution) | 25.52 g |
| Pentaerythritol tetraacrylate | 6.62 g |
| 4-[p-N,N-di(ethoxycarbonylmethyl)]-2,6-di(trichloromethyl)-5-triazine | 0.33 g |
| Hydroquinone monomethyl ether | 0.06 g |
| 1-methoxy-2-propyl acetate | 65.0 g |

By using the resultant colored photosensitive composition A for manufacturing of a color filter, a reflective color filter was manufactured in the following manner.

The colored photosensitive composition A for manufacturing of a color filter was spin-coated to a glass substrate and the coated layer was dried at 100° C. for 2 minutes to form a film having a thickness of about 1.1 $\mu$m. The film was exposed to light using a super-high pressure mercury lamp under a nitrogen stream. After the exposure, the film was developed with a 1% sodium carbonate aqueous solution. The thus obtained reflective color filter was measured for reflectance and chromaticity of the green pixels according to the following methods. The results of the measurements are shown in Table 2.

—Measurements of Reflectance and Chromaticity—

The reflectance and chromaticity of the reflective color filter were measured by use of OSP-SP100 (manufactured by Olympus Optical Co., Ltd.). The value Y obtained by the measurement is one of the tristimulus values X, Y, and Z in the CIE 1931 color system (XYZ color system) and indicates the visual reflectance (a value correlating with lightness of color). The values x and y are the values (values indicating chromaticity coordinates) calculated from the tristimulus values X, Y, and Z using the formulae described supra.

Example 2

A colored photosensitive composition B was prepared in the same manner as in Example 1, except that the yellow pigment dispersion composition (1) was replaced with the yellow pigment dispersion composition (2). The evaluation was made in the same manner as in Example 1.

Example 3

The same procedure as in Example 1 was repeated, except that the colored photosensitive composition A was replaced with the following colored photosensitive composition C for manufacturing of a color filter. The evaluation was performed in the same manner as in Example 1.

[Composition]

| | |
|---|---|
| Yellow pigment dispersion composition (1) described above | 4.72 g |
| C.I. Pigment Green 36 dispersion (GT-2 manufactured by Fuji Film Olin Co., Ltd.) | 6.29 g |
| Methacrylic acid/benzyl methacrylate copolymer (molar ratio: 28/72, weight average molecular weight: 30,000, 30% 1-methoxy-2-propyl acetate solution) | 26.76 g |
| Pentaerythritol tetraacrylate | 6.62 g |
| 4-[p-N,N-di(ethoxycarbonylmethyl)]-2,6-di(trichloromethyl)-5-triazine | 0.33 g |
| Hydroquinone monomethyl ether | 0.06 g |
| 1-methoxy-2-propyl acetate | 65.0 g |

Comparative Example 1

A comparative colored photosensitive composition D was prepared in the same manner as in Example 1, except that the yellow pigment dispersion composition (1) was replaced with the yellow comparative pigment dispersion composition (1). The evaluation was made in the same manner as in Example 1.

Comparative Example 2

A comparative colored photosensitive composition E was prepared in the same manner as in Example 1, except that the yellow pigment dispersion composition (1) was replaced with the yellow comparative pigment dispersion composition (2). The evaluation was conducted in the same manner as in Example 1.

TABLE 2

| | x | y | Y |
|---|---|---|---|
| Example 1 | 0.312 | 0.383 | 88.5 |
| Example 2 | 0.312 | 0.383 | 88.2 |
| Example 3 | 0.313 | 0.375 | 90.5 |
| Comparative Example 1 | 0.309 | 0.383 | 85.4 |
| Comparative Example 2 | 0.312 | 0.383 | 86.5 |

From the results shown in Table 2, it can be seen that the addition of C.I. Pigment Yellow 138 produced increased value Y that indicates reflectance, revealing that higher color purity and superior light transmittance of the color filter were obtained.

As described above, the present invention provides a reflective color filter that displays high contrast, clear color tone and high light transmittance, realizes low electric power consumption, and has green pixels exhibiting high color purity.

What is claimed is:

1. A reflective color filter comprising a substrate having disposed thereon two or more kinds of patterned colored pixels exhibiting mutually different color hues,
    wherein at least one kind of the colored pixels is a green pixel that contains a green pigment and C.I. Pigment Yellow 138, a value y expressed in the x-y system is 0.37 or greater when chromaticity of the green pixel is measured with a D65 light source, and a value Y in the CIE 1931 color system is 87 or greater.

2. The reflective color filter according to claim 1, wherein the value y is 0.37 to 0.40.

3. The reflective color filter according to claim 1, wherein the green pixel contains a pigment dispersion composition containing a green pigment, C.I. Pigment Yellow 138 and a resin.

4. The reflective color filter according to claim 2, wherein the green pixel contains a pigment dispersion composition containing a green pigment, C.I. Pigment Yellow 138 and a resin.

5. The reflective color filter according to claim 1, wherein the green pixel comprises a colored photosensitive composition containing:
    a pigment dispersion composition that contains a green pigment, C.I. Pigment Yellow 138 and a resin;
    a polyfunctional monomer having two or more ethylenically unsaturated double bonds; and
    a photopolymerization initiator.

6. The reflective color filter according to claim 2, wherein the green pixel comprises a colored photosensitive composition containing:
    a pigment dispersion composition that contains a green pigment, C.I. Pigment Yellow 138 and a resin;
    a polyfunctional monomer having two or more ethylenically unsaturated double bonds; and
    a photopolymerization initiator.

7. The reflective color filter according to claim 3, wherein the resin is a polymer having an acidic group.

8. The reflective color filter according to claim 7, wherein an acid value of the polymer having an acidic group is 60 to 130.

9. The reflective color filter according to claim 3, wherein the pigment dispersion composition further contains a dispersant having an azo dye skeleton.

10. The reflective color filter according to claim 9, wherein the dispersant is a compound represented by the general formula (I):

A—N=N—X—Y        General Formula (I)

wherein A represents a group capable of forming an azo dye; X represents a single bond, or a group selected from bivalent linking groups respectively having the following structural formulae;

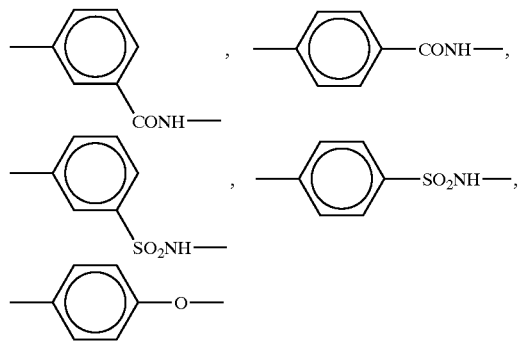

and Y represents a group represented by the general formula (II):

General Formula (II)

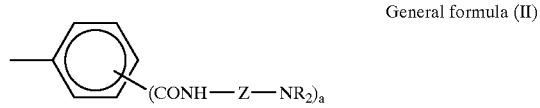

in which Z represents a lower alkylene group; —NR$_2$ represents a lower alkyl amino group, or a 5- or 6-membered saturated heterocycle containing a nitrogen atom; and a represents 1 or 2.

11. The reflective color filter according to claim 5, wherein a layer containing the colored photosensitive composition has a thickness of 0.7 to 3.0 μm.

12. The reflective color filter according to claim 3, wherein the green pigment is contained in an amount of 5 to 20% by mass based on a total mass of the pigment dispersion composition.

13. The reflective color filter according to claim 3, wherein the C.I. Pigment Yellow 138 is contained in an amount of 5 to 20% by mass based on a total mass of the pigment dispersion composition.

14. The reflective color filter according to claim 3, wherein the resin in the pigment dispersion composition is contained in an amount of 10 to 200 parts by mass based on 100 parts by mass of the pigment.

15. The reflective color filter according to claim 9, wherein the dispersant in the pigment dispersion composition is contained in an amount of 0.1 to 100 parts by mass based on 100 parts by mass of the pigment.

16. The reflective color filter according to claim 7, wherein the polymer having an acidic group is selected from the group consisting of a (meth)acrylic acid/(meth)acrylic ester copolymer, a styrene/maleic anhydride copolymer, and a reaction product of a styrene/maleic anhydride copolymer and an alcohol.

17. The reflective color filter according to claim 16, wherein a weight average molecular weight of the polymer having an acidic group is 5,000 to 200,000.

18. The reflective color filter according to claim 1, wherein the colored pixels further contain a pigment selected from the group consisting of a yellow pigment, an orange pigment, a red pigment, a violet pigment, a blue pigment, a green pigment, a brown pigment, and a black pigment.

19. The reflective color filter according to claim 5, wherein the polyfunctional monomer having two or more ethylenically unsaturated double bonds is selected from the group consisting of a (meth)acrylic ester, an urethane (meth)acrylate, a (meth)acrylic amide, an allyl compound, and a vinyl ester.

20. The reflective color filter according to claim 19, wherein the polyfunctional monomer having two or more ethylenically unsaturated double bonds is contained in an amount of 10 to 60% by mass based on a total solid content of the colored photosensitive composition.

* * * * *